(12) United States Patent
Qi et al.

(10) Patent No.: US 12,058,703 B2
(45) Date of Patent: Aug. 6, 2024

(54) METHOD FOR INTEGRATED ACCESS BACKHAUL RESOURCE MULTIPLEXING

(71) Applicant: SAMSUNG ELECTRONICS CO., LTD., Suwon-si (KR)

(72) Inventors: Yinan Qi, Middlesex (GB); Seunghoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/102,137

(22) Filed: Jan. 27, 2023

(65) Prior Publication Data

US 2023/0180268 A1 Jun. 8, 2023

Related U.S. Application Data

(63) Continuation of application No. 16/728,483, filed on Dec. 27, 2019, now abandoned.

(30) Foreign Application Priority Data

Jan. 11, 2019 (GB) ..................................... 1900444

(51) Int. Cl.
*H04W 72/27* (2023.01)
*H04W 72/0446* (2023.01)
(Continued)

(52) U.S. Cl.
CPC ....... *H04W 72/27* (2023.01); *H04W 72/0446* (2013.01); *H04W 72/23* (2023.01); *H04W 88/14* (2013.01)

(58) Field of Classification Search
CPC ........... H04W 72/0426; H04W 72/042; H04W 72/0446; H04W 88/14; H04W 16/26;
(Continued)

(56) References Cited

U.S. PATENT DOCUMENTS

| 10,700,775 B2 | 6/2020 | Novlan |
| 2011/0235571 A1 | 9/2011 | Seo et al. |

(Continued)

FOREIGN PATENT DOCUMENTS

| EP | 3651526 | 5/2020 |
| KR | 10-1489516 | 2/2015 |

(Continued)

OTHER PUBLICATIONS

U.S. Appl. No. 62/789,606, filed Jan. 2019, Tiirola.
(Continued)

*Primary Examiner* — Hoang-Chuong Q Vu
(74) *Attorney, Agent, or Firm* — NIXON & VANDERHYE P.C.

(57) ABSTRACT

A parent node in a wireless communication network is arranged to communicate backhaul traffic wirelessly with an Integrated Access Backhaul (IAB) node. The parent node may determine time resources for a distributed unit (DU) of the IAB node to communicate backhaul traffic with a child node or a mobile terminal, and transmit an indication of the determined time resources to the IAB node. The parent node may also determine time resources for a mobile termination (MT) of the IAB node to communicate backhaul traffic with the parent node, and transmit an indication of the determined time resources to the IAB node. The IAB may receive, from the parent node, at least one indication of time resources for communicating backhaul data with the parent node, and communicate backhaul data with the parent node based on the time resources. The IAB node may also receive, from the parent node, at least one indication of time resources for communicating backhaul data with the child node or the mobile terminal, and communicate backhaul data with the child node or the mobile terminal based on the time resources.

16 Claims, 4 Drawing Sheets

(51) Int. Cl.
*H04W 72/23* (2023.01)
*H04W 88/14* (2009.01)
(58) Field of Classification Search
CPC ..... H04W 92/12; H04W 16/10; H04W 92/20; H04W 72/0406; H04B 7/15542
See application file for complete search history.

(56) References Cited

U.S. PATENT DOCUMENTS

| | | |
|---|---|---|
| 2012/0093059 A1 | 4/2012 | Bai |
| 2012/0120868 A1 | 5/2012 | Park |
| 2013/0250906 A1 | 9/2013 | Golitschek Edler von Elbwart |
| 2019/0132805 A1* | 5/2019 | Abedini ................ H04W 52/54 |
| 2019/0132847 A1* | 5/2019 | Abedini ............ H04W 72/0473 |
| 2019/0289502 A1 | 9/2019 | Abedini |
| 2019/0305923 A1* | 10/2019 | Luo ........................ H04W 72/12 |
| 2019/0349079 A1 | 11/2019 | Novlan |
| 2019/0363810 A1* | 11/2019 | Luo ...................... H04J 11/0053 |
| 2019/0394687 A1* | 12/2019 | Kowalski .......... H04W 36/0061 |
| 2019/0394738 A1 | 12/2019 | Abedini |
| 2020/0112995 A1 | 4/2020 | Islam |
| 2020/0145967 A1 | 5/2020 | Park |
| 2020/0146076 A1* | 5/2020 | Islam .................... H04L 5/0053 |
| 2020/0170010 A1* | 5/2020 | Luo ................... H04W 72/0446 |
| 2020/0229271 A1 | 7/2020 | You |
| 2020/0245311 A1 | 7/2020 | Uchiyama |
| 2021/0058926 A1 | 2/2021 | Li |
| 2021/0212070 A1* | 7/2021 | Luo ................... H04W 72/0446 |
| 2021/0250941 A1* | 8/2021 | Tiirola .................. H04W 40/22 |
| 2021/0273836 A1* | 9/2021 | Luo ........................ H04L 5/0073 |
| 2021/0298000 A1 | 9/2021 | Park |
| 2021/0314942 A1* | 10/2021 | Liu ....................... H04W 72/23 |
| 2021/0329629 A1 | 10/2021 | Xu |
| 2021/0345163 A1 | 11/2021 | Narasimha |
| 2021/0345303 A1 | 11/2021 | Ying |
| 2021/0345322 A1* | 11/2021 | Tiirola .............. H04W 72/1263 |
| 2021/0352666 A1 | 11/2021 | Sirotkin |
| 2021/0352700 A1 | 11/2021 | Lohr |
| 2021/0385776 A1* | 12/2021 | Dahlman .............. H04W 80/02 |
| 2021/0400661 A1 | 12/2021 | Harada |
| 2022/0015093 A1* | 1/2022 | Ying .................. H04B 7/15542 |
| 2022/0086881 A1* | 3/2022 | Liu ................... H04W 72/1273 |
| 2022/0095283 A1* | 3/2022 | Wei .......................... H04L 5/14 |
| 2022/0150889 A1 | 5/2022 | Wei |
| 2022/0225333 A1 | 7/2022 | Liu |

FOREIGN PATENT DOCUMENTS

| | | |
|---|---|---|
| WO | 2020/032578 | 2/2020 |
| WO | 2020/086316 | 4/2020 |
| WO | 2020/091355 | 5/2020 |
| WO | 2020/091959 | 5/2020 |
| WO | 2020/092773 | 5/2020 |
| WO | 2020/092925 | 5/2020 |

OTHER PUBLICATIONS

U.S. Appl. No. 16/728,483, filed Dec. 27, 2019; Qi et al.
Office Action dated May 11, 2021 for U.S. Appl. No. 16/728,483, 18 pages.
Final Office Action dated Nov. 23, 2021 for U.S. Appl. No. 16/728,483, 20 pages.
Office Action dated Mar. 17, 2022 for U.S. Appl. No. 16/728,483, 24 pages.
Final Office Action dated Jul. 11, 2022 for U.S. Appl. No. 16/728,483, 26 pages.
Office Action dated Oct. 27, 2022 for U.S. Appl. No. 16/728,483, 26 pages.
International Search Report and Written Opinion mailed on Apr. 10, 2020 in counterpart International Patent Application No. PCT/KR2019/018564, 9 pages.
Qualcom Incorporated, "Resource Management in IAB Network," R1-1811258, 3GPP TSG RAN WG1 Meeting #94bis, Sep. 29, 2018, section 2.3; and figure 3, 10 pages.
Nokia et al., "Resource allocation/coordination between Parent BH and Child links," R1-1812702, 3GPP TSG RAN WG1 Meeting #95, Nov. 2, 2018, section 2.1-2.3; and figure 1, 13 pages.
Huawei et al., "Physical layer design for NR IAB," R1-1812198, 3GPP TSG RAN WG1 Meeting #95, Nov. 3, 2018, section 3, 17 pages.
LG Electronics, "Discussions on access and backhaul link multiplexing and timing," R1-1812566, 3GPP TSG RAN WG1 Meeting #95, Nov. 4, 2018, section 3, 7 pages.
Combined Search and Examination Report for GB Application No. 1900444.9 dated May 19, 2020, 7 pages.
3GPP TR 38.874 V 16.0.0 (Dec. 2018) Technical Report "3$^{rd}$ Generation Partnership Project; Technical Specification Group Radio Acccess Network; NR; Study on Integrated Access and Backhaul" Release 16, Oct. 1, 2019, 8 pages.
Ericsson, "IAB resource allocation and multiplexing" R1-1813566, 3GPP TSG-RAN WG1 Meeting #95, Spokane, U.S., Nov. 12-16, 2018, 6 pages.
Extended European Search Report for EP Application No. 19908413.8 dated Feb. 8, 2022, 10 pages.
Qualcomm, "Resource Management in IAB Network" R1-1813419, 3GPP TSG RAN WG1 Meeting ·95, Spokane, US, Nov. 12-16, 2018, 7 pages.

* cited by examiner

METHOD FOR INTEGRATED ACCESS BACKHAUL RESOURCE MULTIPLEXING

CROSS-REFERENCE TO RELATED APPLICATIONS

This application is continuation of U.S. application Ser. No. 16/728,483 filed Dec. 27, 2019, which is based on and claims priority under 35 U.S.C. § 119 to Great Britain Patent Application No. 1900444.9 filed on Jan. 11, 2019, in the Great Britain Patent Office, the disclosures of which are incorporated by reference herein in their entirety.

The disclosure relates to techniques for configuring multiplexed Integrated Access Backhaul (IAB) resources. Certain examples relate to IAB configuration for a New Radio (NR) air interface of a wireless communication network, such as has been proposed for Fifth Generation (5G) wireless communication networks.

Wireless or mobile (cellular) communications networks in which a mobile terminal (or a User Equipment (UE), such as a mobile handset) communicates via a radio link with a network of base stations, or other wireless access points or nodes, have undergone rapid development through a number of generations. The $3^{rd}$ Generation Partnership Project (3GPP) design, specify and standardise technologies for mobile wireless communication networks. Fourth Generation (4G) systems are now widely deployed.

3GPP standards for 4G systems include an Evolved Packet Core (EPC) and an Enhanced-UTRAN (E-UTRAN: an Enhanced Universal Terrestrial Radio Access Network). The E-UTRAN uses Long Term Evolution (LTE) radio technology. LTE is commonly used to refer to the whole system including both the EPC and the E-UTRAN, and LTE is used in this sense in the remainder of this document. LTE should also be taken to include LTE enhancements such as LTE Advanced and LTE Pro, which offer enhanced data rates compared to LTE.

The trend towards greater data throughput continues with 3GPP currently working to standardise Fifth Generation (5G) network technologies. As part of this, a new air interface is being developed, which may be referred to as 5G New Radio (5G NR) or simply NR. NR is designed to support the wide variety of services and use case scenarios envisaged for 5G networks, though builds upon established LTE technologies. One aspect of NR is the use of wireless backhaul to reduce network deployment costs and enhance network flexibility by allowing for the topology of the network to be reconfigured. For a conventional wireless communication network, such as LTE, base stations (referred to in LTE as enhanced Node Bs, eNBs) connected to the core network are connected to each other via wired backhaul (BH) links. The base stations are responsible for communicating with mobile devices wirelessly such that those devices may access the core network. Alternatively, a base station may be connected to a core network via a dedicated point-to-point wireless link, quite separate from the process of allowing a device to wirelessly access the base station. As part of NR it is proposed that access for devices to the core network and wireless backhaul may be integrated, which may be referred to as Integrated Access Backhaul (IAB). It will be appreciated that transmission timing and coordination for IAB present challenges that have not been fully resolved.

SUMMARY

Embodiments of the present disclosure are provided to address the issue of transmission timing and coordination for IAB.

According to a first example aspect of the present disclosure there is provided a method of operating a parent node in a wireless communication network, the parent node being arranged to communicate backhaul traffic wirelessly with an Integrated Access Backhaul (IAB) node, the method comprising determining time resources for the IAB node Mobile Termination, MT, to communicate backhaul traffic with the parent node, and transmitting an indication of the determined time resources to the IAB node MT.

According to a second example aspect of the present disclosure there is provided a method of operating a parent node in a wireless communication network, the parent node being arranged to communicate backhaul traffic wirelessly with an Integrated Access Backhaul, IAB, node, the method comprising determining time resources for the IAB node Distributed Unit, DU, to communicate backhaul traffic with a child node and mobile terminals, and transmitting an indication of the determined time resources to the IAB node DU.

According to a third example aspect of the present disclosure there is provided a method of operating an Integrated Access Backhaul, IAB, node in a wireless communication network, the IAB node being arranged to communicate backhaul traffic wirelessly with a parent node and a child node, the method comprising receiving, from the parent node, an indication of time resources for communicating backhaul traffic with the parent node, and communicating backhaul traffic with the parent node using the time resources.

According to a fourth example aspect of the present disclosure there is provided a method of operating an Integrated Access Backhaul, IAB, node in a wireless communication network, the IAB node being arranged to communicate backhaul traffic wirelessly with a parent node and a child node, the method comprising receiving, from the parent node, an indication of time resources for communicating backhaul traffic with the child node and mobile terminals, and communicating backhaul traffic with the child node and mobile terminals using the time resources.

According to a fifth example aspect of the present disclosure there is provided a method of operating a wireless communication network, the network including a parent node, an IAB node, and a child node, the IAB node being arranged to communicate backhaul traffic wirelessly with the parent node and the child node, the method comprising: determining, at the parent node, time resources for the IAB node Mobile Termination, MT, to communicate backhaul traffic with a parent IAB node; transmitting, from the parent node to the IAB node, an indication of the determined time resources to; receiving, at the IAB node, the indication of the time resources; and communicating backhaul traffic from the IAB node to the parent node using the time resources.

According to a sixth example aspect of the present disclosure there is provided method of operating a wireless communication network, the network including a parent node, an IAB node, and a child node, the IAB node being arranged to communicate backhaul traffic wirelessly with the parent node and the child node, the method comprising: determining, at the parent node, time resources for the IAB node to communicate backhaul traffic with a child IAB node; transmitting, from the parent node to the IAB node, an indication of the determined time resources to; receiving, at the IAB node, the indication of time resources; and communicating backhaul traffic from the IAB node to the child node and terminals using the time resources According to a seventh example aspect of the present disclosure there is provided a non-transitory computer readable storage medium having stored thereon computer executable instructions which when executed by a computer cause the computer to perform the above method.

According to a seventh example aspect of the present disclosure there is provided a parent node in a wireless communication network including a transceiver, and a processor, and the processor is configured to determine time resources for a distributed unit (DU) of an integrated access backhaul (IAB) node to communicate backhaul data with a child node or a mobile terminal, and control the transceiver to transmit at least one indication of the determined time resources to the IAB node.

According to a seventh example aspect of the present disclosure there is provided a parent node in a wireless communication network including a transceiver, and a processor, and the processor is configured to determine time resources for a mobile termination (MT) of an integrated access backhaul (IAB) node to communicate backhaul data with the parent node, and control the transceiver to transmit at least one indication of the determined time resources to the IAB node.

According to a seventh example aspect of the present disclosure there is provided an integrated access backhaul (IAB) node in a wireless communication network including a transceiver, and a processor, and the processor is configured to receive, from a parent node via the transceiver, at least one indication of time resources for communicating backhaul data with the parent node, and control the transceiver to communicate backhaul data with the parent node based on the time resources.

According to a seventh example aspect of the present disclosure there is provided an integrated access backhaul (IAB) node in a wireless communication network including a transceiver, and a processor, and the processor is configured to receive, from a parent node via the transceiver, at least one indication of time resources for communicating backhaul data with a child node or a mobile terminal, and control the transceiver to communicate backhaul data with the child node or the mobile terminal based on the time resources.

Another example aspect of the present disclosure provides a computer program comprising instructions, when executed, implement a method and/or apparatus in accordance with any one of the above-described aspects. A further example aspect provides non-transitory machine-readable storage storing such a program.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Embodiments of the present disclosure will now be described in the context of a 5G wireless communication network, and in particular a NR radio access network forming part of a 5G wireless communication network. It will be understood that the present disclosure is not limited to any particular radio access technology. IAB, where backhaul traffic and network access traffic share a transmission frame, is equally applicable in other wireless communication systems where it is desirable to deploy base stations with wireless backhaul. References to particular 3GPP constructs in certain examples should not be understood as limiting the ability of the disclosure to be applied to other wireless communication networks.

The principles of Integrated Access Backhaul will now be described in greater with reference to FIG. 1. In integrated access backhaul (IAB) within a wireless communication network, an IAB node will be connected to a parent node and one or more child nodes, which themselves maybe IAB nodes. That is, each IAB node is allowed to have multiple child nodes. Each IAB node comprises a base station or distributed unit which permits radio access by a device to the network, and performs backhaul communications to communicate access data with the core network. Hereinafter, a node may be referred to a base station. Hereinafter, communicating data or traffic may be referred to as transmitting and/or receiving the data or the traffic.

Figure 1:
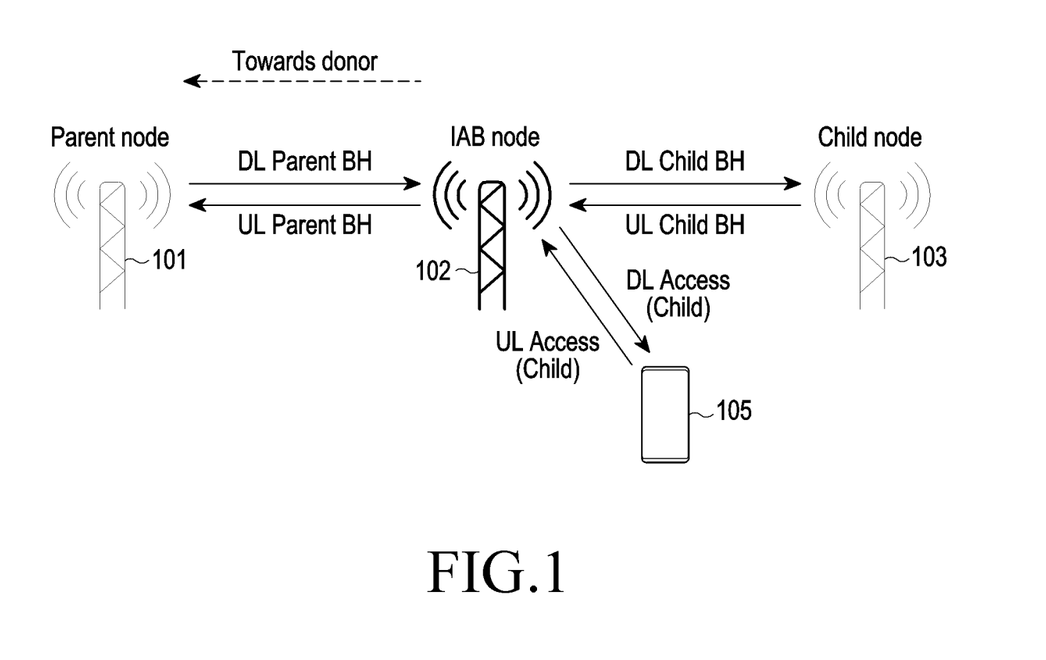
FIG. 1 illustrates an arrangement of three IAB nodes.

FIG. 1 illustrates three nodes: a parent node 101, an IAB node 102 and a child node 103. It will be appreciated that each of nodes 101 to 103 may be identical IAB nodes and that the notations "parent" and "child" in FIG. 1 are relative only to a particular IAB node (in this case, the IAB node 102). That is, for child node 103, its parent node is node 102 and its child node is not illustrated, but logically would appear to the right in the arrangement of FIG. 1. As an exception to this, for each IAB chain of nodes there will be a first node which has a wired or dedicated wireless connection to the core network, and this node may be referred to as a donor node. A donor node does not have a parent node, but acts as the parent node in respect of its child node (or each of its child nodes if it has multiple child nodes). A further exception is that there will be an IAB node which does not have a backhaul connection to any subsequent child node. FIG. 1 does not illustrate a donor node, but logically it would appear to the left of the arrangement of FIG. 1 as indicted by arrow. As noted above, a further exception is that an IAB node may have more than one child node. The IAB configuration techniques disclosed herein apply equally to an IAB node having more than one child node.

FIG. 1 further illustrates an access device wirelessly communicating with IAB node 102. Equally, further access devices may wirelessly communicate with nodes 101 and 103. For the particular example of IAB node 102, this topology results in backhaul (BH) downlink (DL) and uplink (UL) communications with the parent node 101 and the child node 103, and access DL and UL communications with the mobile device 105.

The 3GPP RAN1 working group, meeting #94 in Gothenburg, Sweden on 20 Aug. 2018 agreed upon Time Division Multiplexing (TDM) of BH links and access links for IAB nodes. Specifically, for IAB node TDM, at least the following cases were agreed to be supported as shown in Table 1:

TABLE 1

Cases agreed in RAN1 #94.

| Case | TDM Between: Link 1 | Link 2 | Supported by a pattern? |
|---|---|---|---|
| 1 | $L_{P,DL}$ | $L_{C,DL}$ | Yes |
| 2 | $L_{P,UL}$ | $L_{C,UL}$ | Yes |
| 3 | $L_{P,DL}$ | $L_{C,UL}$ | Yes |
| 4 | $L_{P,UL}$ | $L_{C,DL}$ | Yes |
| 5 | $L_{P,DL}$ | $L_{A,DL}$ | Yes |
| 6 | $L_{P,UL}$ | $L_{A,UL}$ | Yes |
| 7 | $L_{P,DL}$ | $L_{A,UL}$ | Yes |
| 8 | $L_{P,UL}$ | $L_{A,DL}$ | Yes |
| 9 | $L_{P,DL}$ | $L_{A,DL}$ and $L_{C,DL}$ | Yes |
| 10 | $L_{P,UL}$ | $L_{A,UL}$ and $L_{C,UL}$ | Yes |
| 11 | $L_{P,DL}$ | $L_{A,UL}$ and $L_{C,UL}$ | Yes |
| 12 | $L_{P,UL}$ | $L_{A,DL}$ and $L_{C,DL}$ | Yes |
| 13 | $L_{C,DL}$ | $L_{A,DL}$ | * At least Rel. 15 mechanisms can be used, FFS enhancements |
| 14 | $L_{C,UL}$ | $L_{A,UL}$ | * At least Rel. 15 mechanisms can be used, FFS enhancements |
| 15 | $L_{C,DL}$ | $L_{A,UL}$ | * At least Rel. 15 mechanisms can be used, FFS enhancements |
| 16 | $L_{C,UL}$ | $L_{A,DL}$ | * At least Rel. 15 mechanisms can be used, FFS enhancements |

In Table 1 the requirements for TDM between two links are given for 16 different cases. For each link the notation Lx,y is given, where x indicates the party that an IAB node is communication with (P—parent node; C—child node; A—access, that is a device wirelessly accessing the network) and y indicates whether traffic is uplink (UL) or downlink (DL). For instance, $L_{P,DL}$ indicates downlink BH communication from the parent node and $L_{C,UL}$ indicates uplink BH communication from the child node. It will be noted that cases 9 to 12 indicate that in certain cases uplink or downlink communication may be shared between an access device (e.g., the mobile device 105) and a child node for link 2. Table 1 indicates the possible scenarios in which a node may transmit and receive at the same time—that is where link 1 and link 2 may be in use at the same time. For current IAB technology it remains challenging for a node to transmit and receive at the same time. A more practical arrangement, provided by Table 1, is for a node to either send or receive at any instant. That is, the specified links for each case show that two different uplink or downlink links may be applied at the same time. Time sharing may be provided at the symbol level.

Column 4 indicates whether there is a need to define a pattern for TDM for links 1 and 2 for each case. It will be noted that for cases 13 to 16 both links are with a child node and an access device: there is no link with a parent node. 3GPP Release 15 standard mechanisms may be applied to determine TDM between the two links. However, it will be noted that for cases 1 to 12 it has been agreed only that a pattern is required for TDM between links 1 and 2, but currently no method for determining a suitable pattern has been agreed. There is a need to design mechanisms for implementing TDM between links 1 and 2, and particularly there is a need to identify a way of designing patterns for integrating BH and access data at an IAB node.

The 3GPP RAN1 working group have agreed that a given pattern may include simultaneous support for multiple cases though not how this may be implemented. Table 1 identifies two types of links that may be simultaneously supported, though at any given time there may be multiple instances of each type of link: for instance communicating with multiple child nodes and/or access devices.

Different duplexing patterns are supported in NR (as shown in Table 2, below and derived from 3GPP TS 38.211; "NR; Physical channels and modulation", version 15.3.0 dates 27 Sep. 2018, and available at https://portal.3gpp.org/desktopmodules/Specifications/SpecificationDetails.aspx?specificati onId=3213). However, duplexing patterns for TDM of BH links and access links is not currently supported. It can be seen in Table 2 that 61 different duplex patterns are defined for downlink (D) and uplink (U) data in different symbols within a timeframe slot are defined, where X indicates that a symbol is not to be used (that is, the symbol is empty). The formats indicated in rows 0 or 61 of Table 2 are for use by a node for access traffic only: that is, they do not encompass wireless BH and so cannot support IAB nodes. Formats 62 to 255 are reserved for future use. There is a clear need to define how TDM for BH links and access links may be achieved without causing collision between BH links to a parent node and a child node.

TABLE 2

Formats defined by 3GPP TS 38.211.

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| ... | ... | ... | ... | ... | ... | ... | ... | ... | ... | ... | ... | ... | ... | ... |
| 61 | D | D | X | X | X | X | U | D | D | X | X | X | X | U |
| 62-255 | | | | | | Reserved | | | | | | | | |

Certain embodiments of the present disclosure are provide to propose a procedure for the configuration and signalling of resources that are time division multiplexed between backhaul and access links. Certain embodiments of the present disclosure are provided for enhanced flexibility in the time division multiplexing of resources between backhaul and access links for an IAB node communicating with one or more of a parent node, child node, and a mobile terminal.

The 3GPP RAN1 working group, meeting #94b in Chengdu, China on 8 Oct. 2018, resources for child BH links with respect to Distributed Units (DU) of an IAB were agreed.

In particular, from a DU's point-of-view, the child link may have the following types of time resources available.
  downlink time resources
  uplink time resources
  flexible time resources
  not available time resources (i.e. not to be used for communication on the DU's child links)

For each of the DL, UL, and flexible time resource types of the DU child link there may also be two categories of time resources: hard and soft.
  Hard: The corresponding time resources are always available for the DU child link
  Soft: The availability of the corresponding time resources for the DU child link are explicitly and/or implicitly controlled by the parent node As a result of the agreement on these details, a parent node (or Donor) can configure (i.e. multiplex) time domain resources for a child link from a DU and communications with a Mobile Termination (MT) of either the IAB or a child node.

With respect to the parent node determining and configuring the resources for the DU of the IAB node to communicate with a mobile terminal (or a UE), it is different from 3GPP Release 15 resource allocation mechanism in which a next generation node B (gNB) directly determines and configures resources to communicate with access UEs.

In other words, the parent node needs to configure/indicate resources for the MT of the IAB node and it also needs to configure resources for the DU of the IAB for backhaul communications. The former can be may be done by using existing 3GPP Release 15 signalling e.g. TDD-UL-DL-ConfigurationCommon, TDD-UL-DL-ConfigDedicated and DCI format 2.0. However, this is not the case for resource types of DL/UL/flexible/not-available and for hard/soft categories of these resource types. Furthermore, there is also a need for indicating the availability of soft resources for the DU of the IAB in a dynamic manner.

Consequently, there is a need for additional signalling in order to indicate the time multiplexing of resources to an IAB node, and in particular, resource types DL/UL/flexible/not-available, and the hard/soft categories of DL/UL/flexible resources, where soft resources are required to be able to be dynamically configured/indicated.

Resource types including DL/UL/flexible are similar to those defined in 3GPP Release 15 but not-available resources and soft/hard categories of UL/DL/flexible are not. However, dynamic signalling to indicate the availability of soft resources may be considered to be similar to 3GPP Release 15 mechanisms which determine resource usage from flexible resources using DCI format 2.0. Consequently, both semi-static configurations (e.g. TDD-UL-DL-Configuration Common and TDD-UL-DL-ConfigDedicated) and dynamic indication (e.g. DCI format 2.0) for DL/UL/flexible resources which are defined in 3GPP TS38.213 "NR; Physical Layer Procedures for Control", version 15.3, dated 1 Oct. 2018 can be supported.

Therefore, a new approach for resource configurations for an IAB node can be considered and implemented.

1) A parent IAB node configures DL/UL/flexible resources for a MT of an IAB in a semi-static or dynamic manner.
2) The parent IAB node configures DL/UL/flexible/not-available resources for a DU of the IAB node in a semi-static manner and additionally configures hard/soft categories of the resource types UL/DL/flexible.
3) The parent IAB node then dynamically indicates the availability of soft UL/DL/flexible resources for the DU of the IAB node using a DCI format.

In order to implement such a configuration process, and in particular step 2), if existing approaches the signalling of such configuration is used, the format table of 3GPP Release 15 (Table 2) may be required to be changed to include the resource type of "not-available".

In addition to the adaptation of the format table, given the presence of the two categories of resources (hard/soft), the adaptation period and granularity (e.g. slot or symbol-level) for each of these categories may be defined. For example, the hard category resource can be configured in a semi-static manner for a longer adaptation period and the soft category resource can be configured in a dynamic manner for a shorter adaptation period.

Steps 1), 2) and 3) defined above, may be implemented separately or in combination, where their ordering may vary depending on the conditions of the system that they are taking place in. For example, one or more of the steps may be prioritised over the other steps. Furthermore, the resources that are the subject of each of the requests may allocated statically, semi-statically, or dynamically depending on the configuration of the network and/or the current conditions in the network.

The configuration steps set out above may include sub-steps of determining the resources allocation (i.e. time multiplexing) and a signalling/indicating step providing information on the determined resources to the IAB node from the parent node.

With respect to the static and dynamic configuration of the resources, for semi-static configuration, the resources will be configured by a radio resource control (RRC) signalling at the beginning of the respective transmission, and for dynamic configuration, the resources may be configured by DCI on a per slot basis.

Figure 2:
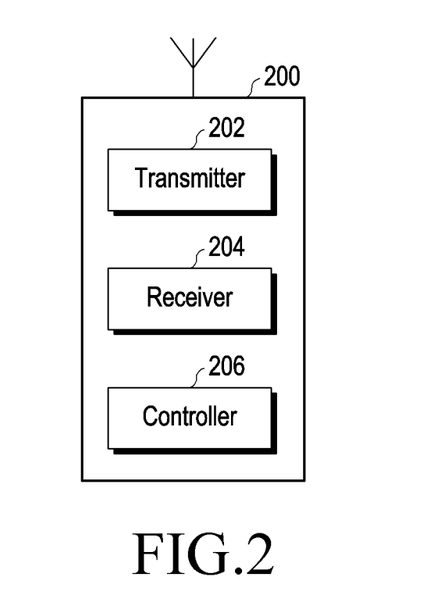
FIG. 2 illustrates an example of a structure of an IAB node.

FIG. 2 provides a schematic diagram of the structure of an IAB node 200 which is arranged to operate in accordance with the examples described above. The IAB node 200 includes a transmitter 202 arranged to transmit signals to a parent node, a child node or an access device; a receiver 204 arranged to receive signals from a parent node, a child node or an access device; and a controller 206 arranged to control the transmitter and receiver and to perform processing such as in accordance with the above described methods. The controller 206 may include at least one processor or may be replaced with the at least one processor. Although the IAB node has been described as communicating with both a parent node and a child node, the structure of FIG. 2 equally applies to a parent IAB node and a child IAB node, albeit with the origin and destination of signals adapted accordingly.

Although in FIG. 2 the transmitter, receiver, and controller have been illustrated as separate elements, any single element or plurality of elements which provide equivalent functionality may be used to implement the examples of the present disclosure described above. For example, the transmitter 202 and the receiver 204 may be replaced with a transceiver for transmitting and/or receiving data.

Figure 3:
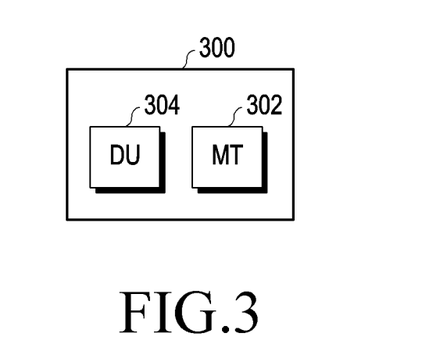
FIG. 3 provides a schematic diagram of a protocol stack of an IAB node which is arranged to operate in accordance with embodiments of the present disclosure.

FIG. 3 provides a schematic diagram of a protocol stack of an IAB node 300 which is arranged to operate in accordance with examples of the present disclosure. The protocol stack of the IAB node 300 includes a mobile termination (MT) (302) which is used to communicate with a parent node, and/or a Distributed Unit (DU) (304) which is used to communicate with a child node or a UE. The MT may be referred to an MT part of the IAB node 300, and the DU may be referred to a DU part of the IAB node 300. Each of the MT or the DU may include at least one of an F1 application protocol (F1-AP) layer, F3-AP layer, a user plane part of GPRS (General Packet Radio Service) tunneling protocol (GTP-U), a stream control transmission protocol (SCTP) layer, a user datagram protocol (UDP) layer, packet data convergence protocol (PDCP) layer, an Internet protocol (IP) layer, a backhaul adaptation protocol (BAP) layer, a radio link control (RLC) layer, a physical (PHY) layer, or a medium access control (MAC) layer. A donor or parent node may hold the control and upper layer functionalities, while the lower layer operations may be delegated to at least one IAB node. Therefore RRC, SDAP and PDCP layers may reside in the donor or parent node, while adaptation, RLC, MAC and PHY layers may be hosted by the at least one IAB node. The adaptation layer may be added on top of the RLC layer, which routes the data across the IAB network topology, hence enabling the end-to-end connection between the at least one IAB node and the donor or parent node. The MT of the at least one IAB node may host at least the adaptation (or BAP), RLC, MAC and PHY layers to maintain the wireless backhaul connection towards an up-stream IAB node (or a parent node) or the donor node. The DU of the at least one IAB node may host at least the adaptation (or BAP), RLC, MAC and PHY layers to provide access connection to a UE or a down-stream MT of another IAB-node.

According to an embodiment of the present disclosure, a parent node in a wireless communication network includes a transceiver and a processor, and the processor is configured to determine time resources for a distributed unit (DU) of an integrated access backhaul (IAB) node to communicate backhaul data with a child node or a mobile terminal, and control the transceiver to transmit at least one indication of the determined time resources to the IAB node.

According to an embodiment of the present disclosure, the processor may be further configured to control the transceiver to transmit a further indication to the IAB node, and the further indication may indicate whether a non-dedicated resource is allocated to backhaul data communication between the IAB node and the child node or the mobile terminal.

According to an embodiment of the present disclosure, the processor may be further configured to determine frequency resources for the DU of the IAB node to communicate backhaul data with the child node or the mobile terminal, and control the transceiver to transmit at least one indication of the determined frequency resources to the IAB node.

According to an embodiment of the present disclosure, the processor may be further configured to control the transceiver to transmit a further indication to the IAB node, and the further indication may indicate whether at least one of an uplink resource, a downlink resource, or a flexible resource is a hard type resource or a soft type resource.

According to an embodiment of the present disclosure, the processor may be further configured to provide information regarding a semi-static configuration or a static configuration of the determined time resources.

According to an embodiment of the present disclosure, the processor may be further configured to dynamically indicate an availability of a resource using a downlink control information (DCI) format.

According to an embodiment of the present disclosure, a parent node in a wireless communication network includes a transceiver and a processor, and the processor is configured to determine time resources for a mobile termination (MT) of an integrated access backhaul (IAB) node to communicate backhaul data with the parent node, and control the transceiver to transmit at least one indication of the determined time resources to the IAB node.

According to an embodiment of the present disclosure, the time resources may be time division multiplexed resources.

According to an embodiment of the present disclosure, the processor may be further configured to determine frequency resources for the MT of the IAB node to communicate backhaul data with the parent node, and control the transceiver to transmit at least one indication of the determined frequency resources to the IAB node.

According to an embodiment of the present disclosure, the processor may be further configured to control the transceiver to transmit a further indication to the IAB node, and the further indication may indicate whether at least one of an uplink resource, a downlink resource, or a flexible resource is a hard type resource or a soft type resource.

According to an embodiment of the present disclosure, the processor may be further configured to dynamically indicate an availability of a resource using a downlink control information (DCI) format.

According to an embodiment of the present disclosure, an integrated access backhaul (IAB) node in a wireless communication network includes a transceiver and a processor, and the processor is configured to receive, from a parent node via the transceiver, at least one indication of time resources for communicating backhaul data with the parent node, and control the transceiver to communicate backhaul data with the parent node based on the time resources.

According to an embodiment of the present disclosure, an integrated access backhaul (IAB) node in a wireless communication network includes a transceiver and a processor, and the processor is configured to receive, from a parent node via the transceiver, at least one indication of time resources for communicating backhaul data with a child node or a mobile terminal, and control the transceiver to communicate backhaul data with the child node or the mobile terminal based on the time resources.

According to an embodiment of the present disclosure, the time resources may include one or more of downlink resources, uplink resources, flexible resources, or unavailable resources, and the flexible resources can be utilised as downlink resources or uplink resources.

According to an embodiment of the present disclosure, the at least one indication may include an indication of whether at least one of an uplink resource, a downlink resource, or a flexible resource is dedicated or non-dedicated to backhaul data communication between the IAB node and the child node or the mobile terminal.

According to an embodiment of the present disclosure, the processor may be further configured to receive, from the parent node via the transceiver, a further indication, and the further indication may indicate whether a non-dedicated resource is allocated to backhaul communication between the IAB node and the child node or the mobile terminal.

According to an embodiment of the present disclosure, the time resources may be time division multiplexed resources.

According to an embodiment of the present disclosure, the processor may be further configured to receive, from the parent node via the transceiver, at least one indication of frequency resources for communicating backhaul data with the child node or the mobile terminal.

According to an embodiment of the present disclosure, the processor may be further configured to receive, from the parent node via the transceiver, information regarding a semi-static configuration or a static configuration of the determined time resources.

According to an embodiment of the present disclosure, the processor may be further configured to receive, from the parent node via the transceiver, dynamic signalling in a downlink control information (DCI) format that indicates an availability of a resource.

According to an embodiment of the present disclosure, a wireless communication system includes a parent node comprising a parent transceiver and a parent processor configured to determine time resources for a distributed unit (DU) of an integrated access backhaul (IAB) node to communicate backhaul data with a child node or a mobile terminal and for a mobile termination (MT) of an integrated access backhaul (IAB) node to communicate backhaul data with the parent node, and control the parent transceiver to transmit at least one indication of the determined time resources to the IAB node, and the IAB node includes an IAB transceiver and an IAB processor configured to receive, from a parent node via the IAB transceiver, at least one indication of time resources for communicating backhaul data with the parent node and at least one indication of time resources for communicating backhaul data with a child node or a mobile terminal, and control the IAB transceiver to communicate backhaul data with the parent node and with the child node or the mobile terminal based on the time resources based on the time resources.

Figure 4:
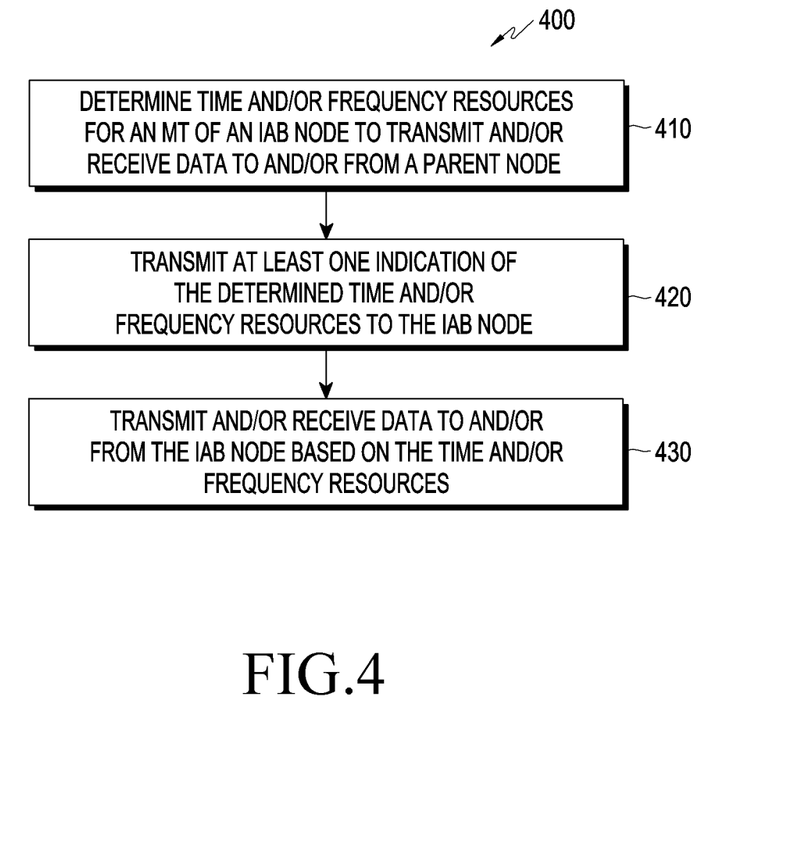
FIG. 4 illustrate an example method for communicating based on IAB resources in accordance with an embodiment of the present disclosure.

FIG. 4 illustrate an example method 400 of operating a parent node for communicating based on IAB resources in accordance with an embodiment of the present disclosure. The method 400 may be performed by at least one processor, a node 101, 102 or 103 of FIG. 1, or an IAB node 300 of FIG. 3. For ease of explanation, the method 400 is described as being performed by a parent node 101 of FIG. 1. The parent node 101 is arranged to communicate backhaul traffic wirelessly with an IAB node 102 in a wireless communication network.

As shown in FIG. 4, in step 410, the parent node 101 may determine time and/or frequency resources for a mobile termination (MT) of the IAB node 102 to transmit and/or receive data to and/or from the parent node. The time and/or frequency resources may include one or more of downlink resources, uplink resources, and/or flexible resources. Alternatively, the time and/or frequency resources may include one or more of downlink resources, uplink resources, flexible resources, and/or unavailable resources. The flexible resources can be utilised as downlink resources or uplink resources.

In step 420, the parent node 101 may transmit at least one indication of the determined time and/or frequency resources to the IAB node. The IAB node receives, from the parent node, the at least one indication of the time and/or frequency resources for communicating backhaul traffic with the parent node. The parent node 101 may transmit two or more indications of the determined time and/or frequency resources to the IAB node, sequentially or simultaneously. For example, the parent node 101 may determine a first time and/or frequency resource and transmit the first time and/or frequency resource to the IAB node. The parent node 101 may determine a second time and/or frequency resource and transmit the second time and/or frequency resource to the IAB node.

The second time and/or frequency resource may be associated with the first time and/or frequency resource. The at least one indication may include an indication of whether one or more of the time and/or frequency resources are each dedicated or non-dedicated to the backhaul traffic communication between the IAB node and the parent node. The at least one indication may include an indication of whether the uplink resources, the downlink resources, and/or the flexible resources are each dedicated or non-dedicated to the backhaul traffic communication between the IAB node and the child node. The at least one indication may include an indication of whether a non-dedicated resource is allocated to the backhaul traffic communication between the IAB node and the parent node. Steps 410 and 420 can be repeated one or more times for determination and notification of different or related time and/or frequency resources.

In step 430, the parent node 101 may transmit and/or receive data to and/or from the IAB node 102 based on the time and/or frequency resources.

According to an embodiment of the present disclosure, there is provided a method of operating a parent node in a wireless communication network, the parent node including at least one processor and being arranged to communicate backhaul data wirelessly with an Integrated Access Backhaul (IAB) node, and the method includes determining time resources for a mobile termination (MT) of the IAB node to communicate backhaul data with the parent node, and transmitting at least one indication of the determined time resources to the IAB node.

According to an embodiment of the present disclosure, the time resources may include one or more of downlink resources, uplink resources, or flexible resources, and wherein the flexible resources can be utilized as downlink resources or uplink resources.

According to an embodiment of the present disclosure, the time resources may be time division multiplexed resources.

According to an embodiment of the present disclosure, the method may further include determining frequency resources for the mobile termination (MT) of the IAB node to communicate backhaul data with the parent node, and transmitting at least one indication of the determined frequency resources to the IAB node.

According to an embodiment of the present disclosure, the method may further include transmitting one or more further indications to the IAB node, and the further indications may indicate whether at least one of the uplink resources, the downlink resources, or the flexible resources is a hard type resource or a soft type resource.

According to an embodiment of the present disclosure, the method may further include using semi-static or dynamic signalling methods existing for mobile terminal access procedures to indicate and configure the determined time resources.

According to an embodiment of the present disclosure, the method may further include dynamically indicating an availability of a resource using a downlink control information (DCI) format.

Figure 5:
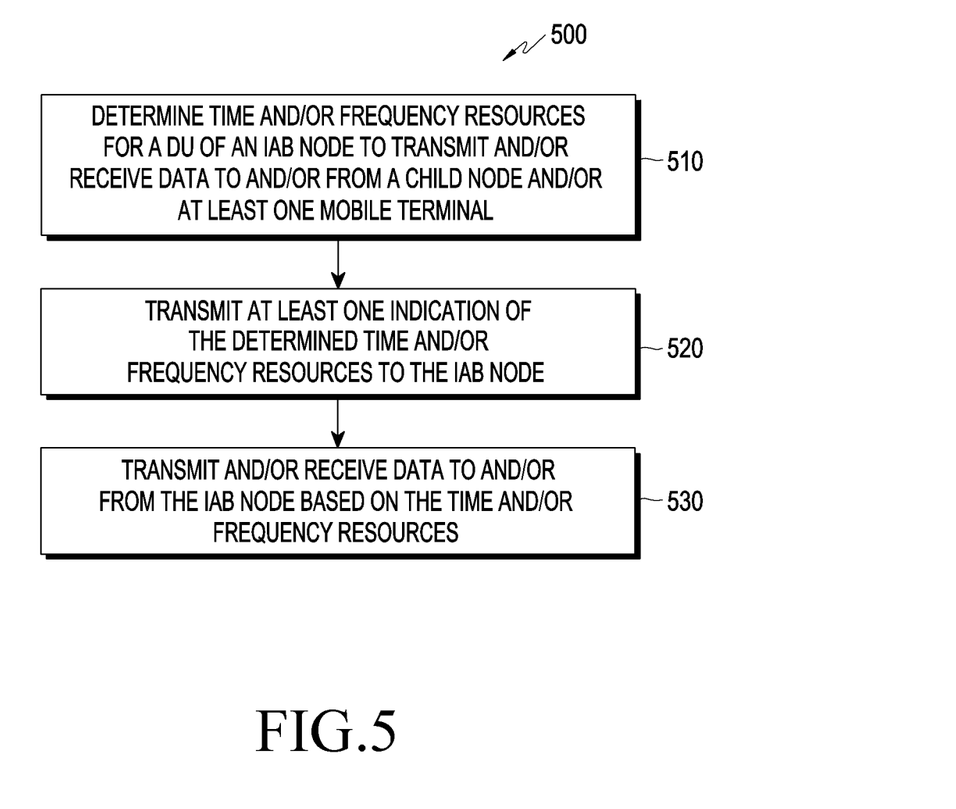
FIG. 5 illustrate an example method for communicating based on IAB resources in accordance with another embodiment of the present disclosure.

FIG. 5 illustrate an example method 500 of operating a parent node for communicating based on IAB resources in accordance with another embodiment of the present disclosure. The method 500 may be performed by at least one processor, a node 101, 102 or 103 of FIG. 1, or an IAB node 300 of FIG. 3. For ease of explanation, the method 400 is described as being performed by a parent node 1 of FIG. 1. The parent node 101 is arranged to communicate backhaul traffic wirelessly with an IAB node 102 in a wireless communication network.

As shown in FIG. 5, in step 510, the parent node 101 may determine time and/or frequency resources for a DU of the IAB node 102 to transmit and/or receive data to and/or from a child node and/or at least one mobile terminal. The time and/or frequency resources may include one or more of downlink resources, uplink resources, and/or flexible resources. Alternatively, the time and/or frequency resources may include one or more of downlink resources, uplink resources, flexible resources, and/or unavailable resources. The flexible resources can be utilised as downlink resources or uplink resources.

In step 520, the parent node 101 may transmit at least one indication of the determined time and/or frequency resources to the IAB node. The IAB node receives, from the parent node, the at least one indication of the time and/or frequency resources for communicating backhaul traffic with the child node and/or the at least one mobile terminal. The parent node 101 may transmit two or more indications of the determined time and/or frequency resources to the IAB node, sequentially or simultaneously. For example, the parent node 101 may determine a first time and/or frequency resource and transmit the first time and/or frequency resource to the IAB node. The parent node 101 may determine a second time and/or frequency resource and transmit the second time and/or frequency resource to the IAB node.

The second time and/or frequency resource may be associated with the first time and/or frequency resource. The at least one indication may include an indication of whether one or more of the time and/or frequency resources are each dedicated or non-dedicated to the backhaul traffic communication between the IAB node and the child node and/or the at least one mobile terminal. The at least one indication may include an indication of whether the uplink resources, the downlink resources, and/or the flexible resources are each dedicated or non-dedicated to the backhaul traffic communication between the IAB node and the child node and/or the at least one mobile terminal. The at least one indication may include an indication of whether a non-dedicated resource is allocated to the backhaul traffic communication between the IAB node and the child node and/or the at least one mobile terminal. Steps 510 and 520 can be repeated one or more times for determination and notification of different or related time and/or frequency resources.

In step 530, the parent node 101 may transmit and/or receive data to and/or from the child node and/or the at least one mobile terminal based on the time and/or frequency resources.

According to an embodiment of the present disclosure, there is provided a method of operating a parent node in a wireless communication network, the parent node including at least one processor and being arranged to communicate backhaul data wirelessly with an integrated access backhaul (IAB) node, and the method includes determining time resources for a distributed unit (DU) of the IAB node to communicate backhaul data with a child node or a mobile terminal, and transmitting at least one indication of the determined time resources to the IAB node.

According to an embodiment of the present disclosure, the method may further include transmitting one or more further indications to the IAB node, the further indications indicating whether non-dedicated resources are allocated to the backhaul data communication between the IAB node and the child node or the mobile terminal.

According to an embodiment of the present disclosure, the method may further include determining frequency resources for the distributed unit (DU) of the IAB node to communicate backhaul data with a child node or a mobile terminal, and transmitting at least one indication of the determined frequency resources to the IAB node.

According to an embodiment of the present disclosure, the method may further include transmitting one or more further indications to the IAB node, the further indications may indicate whether at least one of the uplink resources, the downlink resources, or the flexible resources is a hard type resource or a soft type resource.

According to an embodiment of the present disclosure, the method may further include providing information regarding a semi-static configuration or a static configuration of the determined time resources.

According to an embodiment of the present disclosure, the method may further include dynamically indicating an availability of a resource using a downlink control information (DCI) format.

According to an embodiment of the present disclosure, there is provided a method of operating an integrated access backhaul (IAB) node including at least one processor and being arranged to communicate backhaul data wirelessly with a parent node or a child node, and the method includes receiving, from the parent node, at least one indication of time resources for communicating backhaul data with the child node or the mobile terminal, and communicating backhaul data with the child node or the mobile terminal based on the time resources.

According to an embodiment of the present disclosure, the time resources may include one or more of downlink resources, uplink resources, flexible resources, or unavailable resources, and the flexible resources can be utilized as downlink resources or uplink resources.

According to an embodiment of the present disclosure, the at least one indication may include an indication of whether at least one of the uplink resources, the downlink resources, or the flexible resources are each dedicated or non-dedicated to backhaul data communication between the IAB node and the child node or the mobile terminal.

According to an embodiment of the present disclosure, the method may further include receiving, from the parent node, one or more further indications, and the further indications may indicate whether non-dedicated resources are allocated to backhaul communication between the IAB node and the child node or the mobile terminal.

According to an embodiment of the present disclosure, the time resources may be time division multiplexed resources.

According to an embodiment of the present disclosure, the method may further include receiving, from the parent node, at least one indication of frequency resources for communicating backhaul data with the child node or the mobile terminal.

According to an embodiment of the present disclosure, the method may further include receiving one or more further indications from the parent node, the further indications indicating at least one of the uplink resources, the downlink resources, or the flexible resources.

According to an embodiment of the present disclosure, the method may further include receiving information regarding a semi-static configuration or a static configuration of the determined time resources.

According to an embodiment of the present disclosure, the method may further include receiving from the parent node dynamic signalling in a downlink control information (DCI) format that indicates an availability of a resource.

Throughout the description and claims of this specification, the words "comprise" and "contain" and variations of them may mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the present disclosure may also be implemented via computer executable instructions stored on a computer readable storage medium, such that when executed cause a computer to operate in accordance with any other the aforementioned embodiments. For example, the IAB node 200 may further include a memory for storing the computer executable instructions which, when executed by the controller 206, cause the IAB node 200 to operate in accordance with any other the aforementioned embodiments.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be used without departing from the scope of the disclosure, which is defined in the accompanying claims.

What is claimed is:

1. A donor node in a wireless communication network, the donor node comprising:
    a transceiver; and
    a processor coupled with the transceiver and configured to control to:
    determine time resources for a distributed unit (DU) of an integrated access backhaul (IAB) node and time resources for a mobile termination (MT) of the IAB node,
    transmit, to the IAB node, first information on the time resources for the DU of the IAB node, and
    transmit, to the IAB node, second information on the time resources for the MT of the IAB node,
    wherein the time resources for the MT of the IAB node are indicated by first downlink control information (DCI) on a slot basis, and the time resources for the MT of the IAB node include an uplink resource, a downlink resource, and a flexible resource,
    wherein a symbol in a slot for the DU of the IAB node is configured to be of a hard type, a soft type, or an unavailable type,
    wherein availability of a soft type resource for the DU of the IAB node is indicated by second DCI different from the first DCI, and
    wherein at least one of an uplink soft symbol, a downlink soft symbol, and a flexible soft symbol in the soft type resource is configured to be available.

2. The donor node of claim 1, wherein the first information includes an indication of whether at least one of an uplink resource, a downlink resource, or a flexible resource is dedicated to communication between the IAB node and the child node or the mobile terminal, and
    wherein the second information includes an indication of whether at least one of an uplink resource, a downlink resource, or a flexible resource is dedicated to communication between the IAB node and the donor node.

3. The donor node of claim 1, wherein the processor is further configured to:
    transmit an indication to the IAB node, the indication indicating whether a non-dedicated resource is allocated to backhaul data communication between the IAB node and the child node or the mobile terminal.

4. The donor node of claim 1, wherein the processor is further configured to:
    determine frequency resources for the DU of the IAB node to communicate backhaul data with the child node or the mobile terminal; and
    transmit indication of the determined frequency resources to the IAB node.

5. The donor node of claim 1, wherein the first information is configured in a semi-static manner or dynamic manner.

6. The donor node of claim 1, wherein the time resources for the MT are time division multiplexed resources.

7. The donor node of claim 1, wherein the processor is further configured to:
    determine frequency resources for the MT of the IAB node to communicate backhaul data with the donor node; and
    transmit an indication of the determined frequency resources to the IAB node.

8. An integrated access backhaul (IAB) node in a wireless communication network, the IAB node comprising:
    a transceiver; and
    a processor coupled with the transceiver and configured to control to:
    receive, from a donor node via the transceiver, first information on time resources for a distributed unit (DU) of an integrated access backhaul (IAB) node, and second information on time resources for a mobile termination (MT) of the IAB node,
    communicate with a child node or a mobile terminal based on the first information, and
    communicate with the donor node based on the second information,
    wherein the time resources for the MT of the IAB node are indicated by first downlink control information (DCI) on a slot basis, and the time resources for the MT of the IAB node include an uplink resource, a downlink resource, and a flexible resource,
    wherein a symbol in a slot for the DU of the IAB node is configured to be of a hard type, a soft type, or an unavailable type,
    wherein availability of a soft type resource for the DU of the IAB node is indicated by second DCI different from the first DCI, and
    wherein at least one of an uplink soft symbol, a downlink soft symbol, and a flexible soft symbol in the soft type resource is configured to be available.

9. The IAB node of claim 8, wherein the first information includes an indication of whether an uplink resource, a downlink resources, and a flexible resources is dedicated to communication between the IAB node and the child node or the mobile terminal, and
    wherein the second information includes an indication of whether at least one of an uplink resource, a downlink resource, or a flexible resource is dedicated to communication between the IAB node and the donor node.

10. The IAB node of claim 8, wherein the processor is further configured to:
  receive, from the donor node via the transceiver, an indication, the indication indicating whether a non-dedicated resource is allocated to backhaul communication between the IAB node and the child node or the mobile terminal.

11. The IAB node of claim 8, wherein the time resources for the MT are time division multiplexed resources.

12. The IAB node of claim 8, wherein the processor is further configured to receive, from the donor node via the transceiver, an indication of frequency resources for communicating backhaul data with the child node or the mobile terminal.

13. The IAB node of claim 8, wherein the first information is configured in a semi-static manner or a dynamic manner.

14. A method by a donor node in a wireless communication network, the donor node arranged to communicate backhaul data wirelessly with an integrated access backhaul (IAB) node, the method comprising:
  determining time resources for a distributed unit (DU) of the IAB node and time resources for a mobile termination (MT) of the IAB node;
  transmitting, to the IAB node, first information on the time resources for the DU of the IAB node; and
  transmitting, to the IAB node, second information on the time resources for the MT of the IAB node,
  wherein the time resources for the MT of the IAB node are indicated by first downlink control information (DCI) on a slot basis, and the time resources for the MT of the IAB node include an uplink resource, a downlink resource, and a flexible resource,
  wherein a symbol in a slot for the DU of the IAB node is configured to be of a hard type, a soft type, or an unavailable type,
  wherein availability of a soft type resource for the DU of the IAB node is indicated by second DCI different from the first DCI, and
  wherein at least one of an uplink soft symbol, a downlink soft symbol, and a flexible soft symbol in the soft type resource is configured to be available.

15. The method of claim 14, wherein the first information includes an indication of whether at least one of an uplink resource, a downlink resource, or a flexible resource is dedicated to communication between the IAB node and the child node or the mobile terminal, and
  wherein the second information includes an indication of whether at least one of an uplink resource, a downlink resource, or a flexible resource is dedicated to communication between the IAB node and the donor node.

16. A method by an integrated access backhaul (IAB) node in a wireless communication network, the IAB node being arranged to communicate backhaul data wirelessly with a donor node or a child node, the method comprising:
  receiving, from the donor node, first information on time resources for a distributed unit (DU) of an integrated access backhaul (IAB) node and second information on time resources for a mobile termination (MT) of the IAB node;
  communicating with a child node or a mobile terminal based on the first information; and
  communicating with the donor node based on the second information,
  wherein the time resources for the MT of the IAB node are indicated by first downlink control information (DCI) on a slot basis, and the time resources for the MT of the IAB node include an uplink resource, a downlink resource, and a flexible resource,
  wherein a symbol in a slot for the DU of the IAB node is configured to be of a hard type, a soft type, or an unavailable type,
  wherein availability of a soft type resource for the DU of the IAB node is indicated by second DCI different from the first DCI, and
  wherein at least one of an uplink soft symbol, a downlink soft symbol, and a flexible soft symbol in the soft type resource is configured to be available.

\* \* \* \* \*

UNITED STATES PATENT AND TRADEMARK OFFICE
CERTIFICATE OF CORRECTION

PATENT NO. : 12,058,703 B2
APPLICATION NO. : 18/102137
DATED : August 6, 2024
INVENTOR(S) : Yinan Qi et al.

It is certified that error appears in the above-identified patent and that said Letters Patent is hereby corrected as shown below:

In the Claims

Claim 1, last line, at Column 15, Line 60, change "configured" to --indicated--.

Claim 8, last line, at Column 16, Line 58, change "configured" to --indicated--.

Claim 14, last line, at Column 18, Line 3, change "configured" to --indicated--.

Claim 16, last line, at Column 18, Line 38, change "configured" to --indicated--.

Signed and Sealed this
First Day of October, 2024

Katherine Kelly Vidal
*Director of the United States Patent and Trademark Office*